United States Patent [19]
Bantz et al.

[11] Patent Number: 5,515,439
[45] Date of Patent: May 7, 1996

[54] EXCHANGE CERTIFICATE FOR ONE WAY VALIDATION OF INFORMATION

[75] Inventors: David Bantz, Chappaqua, N.Y.; Frederic Bauchot, Saint-Jeannet, France; Eliane D. Bello, Jardim Flamboyant Campinas, Brazil; Shay Kutten, Rockaway, N.J.; Hugo Krawczyk, Riverdale; Amir Herzberg, Bronx, both of N.Y.; Yishay Mansour, Tel Aviv, Israel

[73] Assignee: International Business Machines Corporation, Armonk, N.Y.

[21] Appl. No.: 336,605

[22] Filed: Nov. 9, 1994

[30] Foreign Application Priority Data

Dec. 3, 1993 [EP] European Pat. Off. ............ 93480210

[51] Int. Cl.⁶ .................................................. H04L 9/32
[52] U.S. Cl. .............................. 380/23; 380/21; 380/25; 380/49
[58] Field of Search ........................... 380/9, 21, 23, 380/25, 49, 50, 30

[56] References Cited

U.S. PATENT DOCUMENTS 5,148,479  9/1992  Bird et al. .................................. 380/23
5,371,794  12/1994  Diffie et al. ............................... 380/21

FOREIGN PATENT DOCUMENTS 0505302  11/1992  European Pat. Off. .......... H04L 9/00

*Primary Examiner*—Bernarr E. Gregory
*Attorney, Agent, or Firm*—Stephen T. Keohane

[57] ABSTRACT

In a communications system, a method is described allowing two users having established a communication session identified by a unique session freshness proof, to transmit and validate a new value of a variable by using an exchange certificate which combines the following elements: the new value of the variable, a common secret key known by both users, an exchange counter representative of the number of values of said variable transmitted between the two users during the current communication session and a session freshness proof. Protection against potential eavesdroppers and intruders is provided by combining cryptographically the elements of the exchange certificate. Further protection is obtained by interrupting the current communication session and opening a new one characterized by a new unique session freshness proof when the exchange counter reaches its maximum value; thus avoiding the risk that the same value of the session freshness keeps being used when the exchange counter is reset to its initial value. Consequently a given pair of values of the session freshness proof and of the exchange counter will never be used more than one time, making eavesdropping and, replaying attacks from intruders more difficult. Preferably, the method used for opening a new communication session uses already known authentication methods based on the common secret key.

18 Claims, 7 Drawing Sheets

EXCHANGE CERTIFICATE FOR ONE WAY VALIDATION OF INFORMATION

TECHNICAL FIELD

The present invention generally relates to methods to maintain security in computer networks. In particular, it relates to methods for validating information exchanged between authorized users or other authorized network entities.

BACKGROUND ART

Computer network security techniques include a wide range of methods such as access control mechanisms, user authentication methods, cryptographic systems and traffic integrity protection. Appropriate selection and combination of such methods allows to build very secure networks at the expense of overall system complexity, cost increase and performance degradation. This is particularly the case in the arena of encryption keys distribution services for which dynamic schemes using key distribution servers have been developed.

U.S. Pat. No. 5,148,479 discloses a method of mutually authenticating users on a communications session. A first user A transmits a challenge N1 to a second user B. In response to the first challenge, B generates a first response to the challenge N1 and transmits it to A along with a second challenge N2. User A verifies that the first response to the challenge N1 is correct and then generates and transmits to B a second response to the second challenge N2. User B verifies that the second response is correct. User A and user B are supposed to share a secret which allows them to verify the correctness of the responses to their challenges. Ideally challenges should be different in every authentication instance, therefore it is suggested that challenges be selected randomly from a huge space; these challenges are called nonce challenges.

This kind of user authentication methods does not always provide sufficient protection against intruders attacks, for instance when data lines cannot be physically secured from taps. More generally, intercept attacks where an intruder merely intercepts messages from a user A to a user B and forwards them on to their intended destination B cannot be defended against with user authentication protocols; for instance, such theft and replay attacks can occur in wireless data communications systems using radio frequency or infrared transmission. In such a case, measures are necessary to provide data security in addition to the methods allowing user A and user B to authenticate one another. The encryption of the data flow between A and B is obviously one of these measures. One of the best known secret-key cryptosystems is the so called Data Encryption Standard (DES) which has been standardized by ANSI; it is a block cipher system capable of encrypting one 64-bit block of data at a time, using a 64-bit key. With all block cipher systems such as DES using the same encryption key for large amounts of data increases the risk that a potential intruder might break the cryptographic code through statistical crypt analysis. Therefore when such block cipher systems are used it is necessary to modify dynamically encryption keys to avoid that an intruder may break the cryptographic code.

Dynamic key distribution schemes provide robust methods for key distribution and modification; a key server maintains one secret or public master key for every user or entity in its network, which enables it to distribute encryption keys for peer entities wanting to authenticate one another and communicate.

Upon demand of a user A willing to communicate with a user B, the key server (KS) will securely inform A of the secret key which it may use to communicate with user B. Such methods require a significant number of data flows between A, B and KS. Most of these methods use long messages which make them unsuitable for low network layers. Some require synchronized clocks such as the so called Kerberos authentication service; it is based on the so called Needham Schroeder protocol and uses time tamps depending on reliable synchronized clocks to guarantee the freshness of messages.

European patent application No 0254812 describes a method for key distribution using a key distribution center (KDC), where in advance the remote device has installed in it only the public key of the KDC. The method of this invention still requires that at least two data flows be exchanged to distribute a fresh encryption key.

The complexity and performance degradation associated with prior art key distribution methods is not adequate for low cost communications systems such as wireless local area networks which are on one hand very vulnerable to eavesdroppers and intruders and on the other hand have to meet very stringent cost and performance requirements.

SUMMARY OF THE INVENTION

It is therefore an object of the present invention to provide a simple, while safe and reliable, method for dynamically transmitting and validating an encryption key without requiring use of either a clock, a key server or non-volatile counters.

It is also an object of the present invention to provide such a method for dynamically transmitting and validating the value of any variable between two users of a communications network.

Prior to describing the invention in details, it is convenient to present one of its aspects. The subject invention assumes that a communications session in a network has been established between two users A and B and that A and B share a common secret key S; Es(I) represents the result of the encryption of information I using the DES encryption under the secret key S and Ds(I) represents the result of the corresponding decryption function so that Ds(Es(I))=I. The communication session between A and B has been opened and is identified by means of a unique session identifier which is used as a session freshness proof. As a particular example, the authentication method described in U.S. Pat. No. 5,148,479 based on the shared secret S can be used to open the communication session between A and B in which case either of the nonce challenges N1 and N2 used in said method may be used as the unique session identifier. In this particular example N2 will be used as the session freshness proof.

Let us call K a first value of a variable shared by A and B and K' the next value of said variable. Both parties to the connection, A and B, control an exchange counter, respectively c1 and c2, which is incremented each time a new value of said variable is transmitted by A and validated by B, or reciprocally, each time a new value of said variable is transmitted by B and validated by A. In normal operating conditions c1 and c2 should have the same value.

Either party to the connection A or B may decide to transmit a new value K' of said variable; it is assumed that this operation is initiated by A. For that purpose A generates a new value of said variable K', prepares an exchange certificate M comprising three fields of information M1, M2, M3 and sends it to B; the first field M1 of the exchange certificate is the new value K' encrypted under the secret key S, M1=Es(K');

the second field M2 binds cryptographically the new value K' to the session identifier N2 and to the exchange counter c1, in the following expression, M2=Es(N2⊕Es(K'⊕c1)), where ⊕ stands for an exclusive bit by bit OR operation; the third field M3 is the clear text value of the exchange counter c1, M3=c1.

Upon receipt of this exchange certificate, B performs a synchronization test by comparing the clear text value of the exchange counter c1 provided in the exchange certificate with its own knowledge of the exchange counter c2. If the synchronization test is successful, B uses its secret key S to decrypt M1 and obtain the new value K'.

K'=Ds(M1)

Based on its knowledge of the secret key S, the session freshness proof N2 and K', B validates K' by checking that the following equation is verified:

Es(N2⊕Es(K'⊕c2))=M2

B validates the new value K' of said variable as the new instance of K if both the synchronization and the validation tests are successful.

Upon failure of said validation test, said communication session between A and B is interrupted because it cannot be trusted anymore, and a new communication session identified by a new unique session freshness proof is opened. The method of the invention is then used at the initiative of either A or B to transmit again a new value of the variable.

This aspect of the invention is merely illustrative of the principles of the invention which can be summarized as:

A method for transmitting a value K' of a variable, between a first user A of a communications system and a second user B, and for validating said value K', said users sharing a common secret key S and having established a first communication session identified by a first unique session freshness proof N2 known to both user A and user B, said method being characterized in that it comprises the steps of:

1. transmitting from A to B said value K' by means of an exchange certificate M comprising at least two fields M1 and M2 of the minimum form:

M1=f(S,K',...)

M2=g(S,K',N2,c1,...)

wherein f( ) and g( ) are functions such that, f(S,K',...)=m1 cannot be solved for K' without knowledge of S, m1 being a given value of field M1 and, g(S,K',N2,c1,...)=m2 cannot be solved for K' without knowledge of S, m2 being a given value of field M2;

and wherein, c1 is an exchange counter controlled by A and representative of the number of values of said variable exchanged between user A and user B during said first communication session.

2. processing by B of said exchange certificate M comprising the steps of:

- deriving from said exchange certificate M said value K' as a result of solving for K' equation:

f(S,K',...)=M1; and

- validating said value K' as a result of the verification of a set of validation conditions comprising at least an equation of the minimum form:

g(S,K',N2,c2,...)=M2 wherein, c2 is an exchange counter controlled by B and representative of the number of values of said variable exchanged between user A and user B during said first communication session.

3. interrupting at the initiative of either A or B said first communication session between A and B and opening a second communication session identified by a second unique session freshness proof upon occurrence of anyone of a set of session reset conditions, said set of reset conditions comprising:

- failure of at least one of said validation conditions; and
- the event that either of exchange counters c1 and c2 reaches its maximum value.

BRIEF DESCRIPTION OF THE FIGURES

The foregoing and other objects, aspects and advantages will be better understood from the following detailed description of a preferred embodiment of the invention with reference to the drawing, in which.

DESCRIPTION OF THE INVENTION

Figure 1:
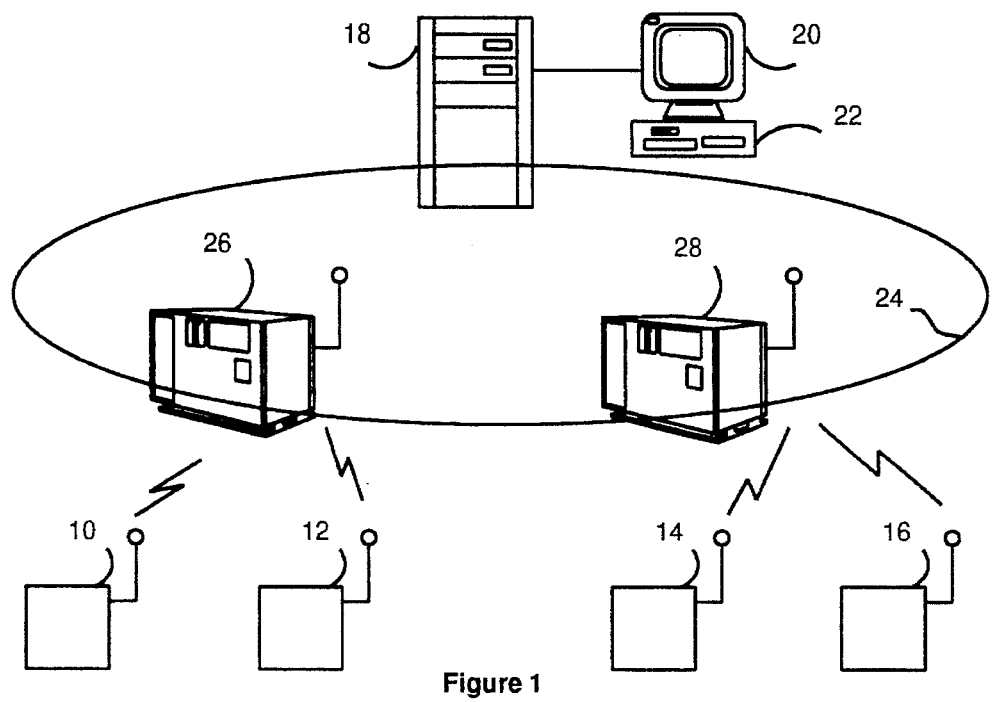
FIG. 1 is a pictorial diagram showing an indoor radio or infrared digital data communication system of the type in which the invention is implemented.

Referring now to the drawing, and more particularly to FIG. 1, there is shown an indoor radio or infrared system allowing communication between a plurality of mobile stations 10, 12, 14 and 16 and applications and data residing in a computing system. The computing system typically includes a server 18, with attached monitor 20 and keyboard 22, of a local area network (LAN), generally indicated by reference numeral 24, having a plurality of attached workstations or personal computers (not shown for simplicity). Also attached to the LAN are one or more base stations 26 and 28 with which the mobile stations 10, 12, 14 and 16 communicate, using a common radio or infrared channel. The invention is aimed at improving the security of information exchange between the base stations and the mobile stations they are communicating with. Although the remainder of this description assumes that the communication channel used in this particular embodiment of the invention is a radio frequency channel, the man skilled in the art will easily understand that any other communication channel, including an infrared channel, can be used.

Figure 1A:
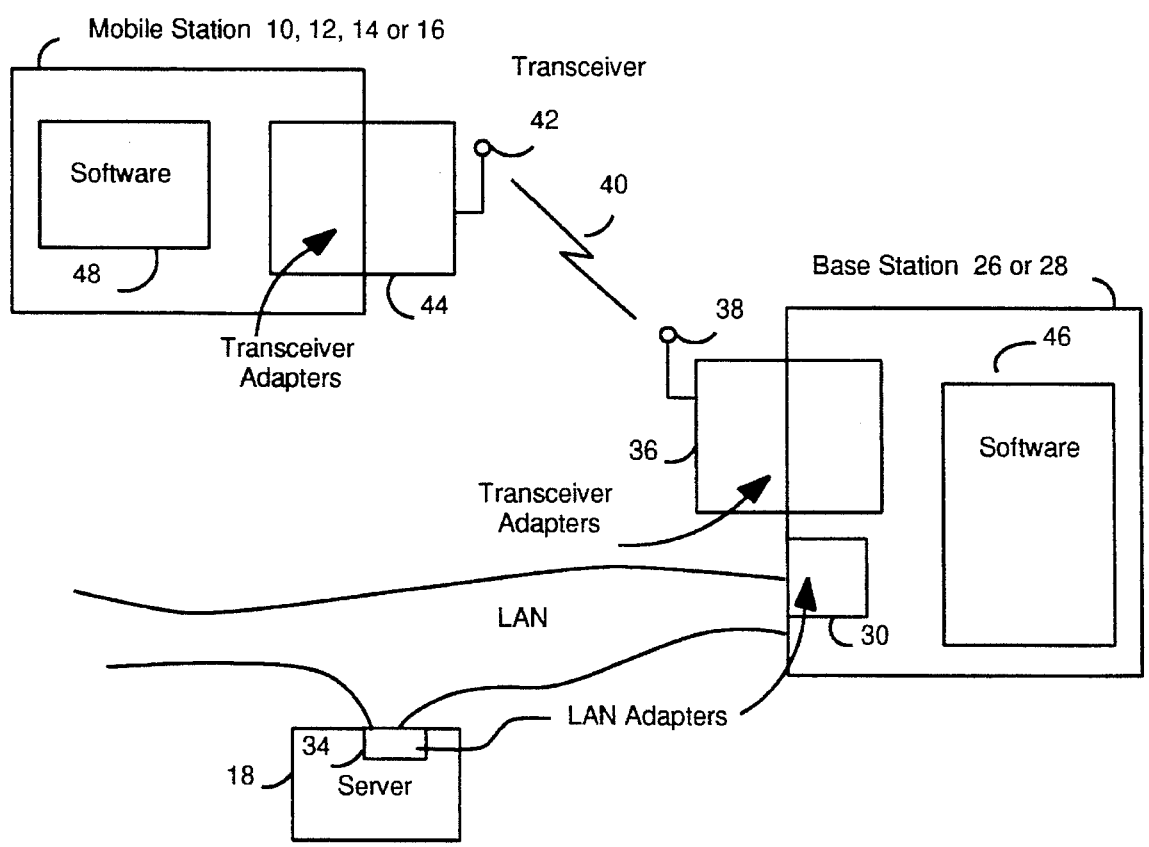
FIG. 1A is a block diagram of the system shown in FIG. 1 illustrating the basic components of a mobile station and a base station.

As shown in more detail in FIG. 1A, a base station 26 or 28, which may be a conventional microcomputer, has a LAN adapter 30 inserted in a bus slot and connected to LAN cabling 32. The server 18, typically also a conventional microcomputer and including one or more direct access storage devices (DASDs) such as hard disks (not shown), also has a LAN adapter 34 inserted in a bus slot and connected to LAN cabling 32. The LAN adapters 30 and 34 and the LAN cabling 32 together with LAN software constitute the LAN 24. The LAN 24 is of conventional design and does not form part of the invention. The base station 26 or 28 also has an RF transceiver adapter 36 implemented as a printed circuit card which is inserted in a bus slot of the base station. The transceiver adapter 36 includes a spread spectrum transceiver of conventional design. The transceiver adapter 36 has an antenna 38 by which a radio link 40 is established with one or more remote or mobile stations 10, 12, 14 or 16. The mobile station may itself be a hand held or lap top computer of conventional design, and, like the base station, it is provided with an antenna 42 and a transceiver adapter 44, also implemented as a printed circuit card which is inserted in a bus slot of the computer. The transceiver adapter 44, like transceiver adapter 36, includes a spread spectrum transceiver of similar design. The base station and the mobile stations are further provided with software, generally indicated by reference numerals 46 and 48, respectively, which support their respective transceiver adapters.

One form of indoor data radio uses a transmission technique known as "spread spectrum", authorized by the U.S. Federal Communications Commission (FCC) in its regulations, part 15.247, for use in certain frequency bands without user license. Spread spectrum communications offer several advantages including low density power spectra and interference rejection. There are several types of spread spectrum systems including direct sequence digital systems, frequency hopping systems, time hopping systems, pulsed frequency modulated (or chirp) systems, and various hybrids. Of these, the direct sequence digital systems and the frequency hopping systems are perhaps the more widely implemented. In a direct sequence digital system, a fast pseudo-random code generator is used to modulate slower digital data which, in turn, modulates a carrier. In a frequency hopping system, a coherent local oscillator is made to jump from one frequency to another under the influence of a pseudo-random code generator.

The subject invention may be implemented using either direct sequence digital or frequency hopping types of spread spectrum communications systems. A description of these and other types of spread spectrum communications systems may be found, for example, in Spread Spectrum Systems, 2nd Ed., by Robert C. Dixon, John Wiley & Sons (1984), and Spread Spectrum Communications, Vol. II, by M. K. Simon et al., Computer Science Press (1985).

U.S. Pat. No. 5,123,029 describes a protocol which could be used for digital data radio communication in this embodiment of the present invention.

Figure 2:
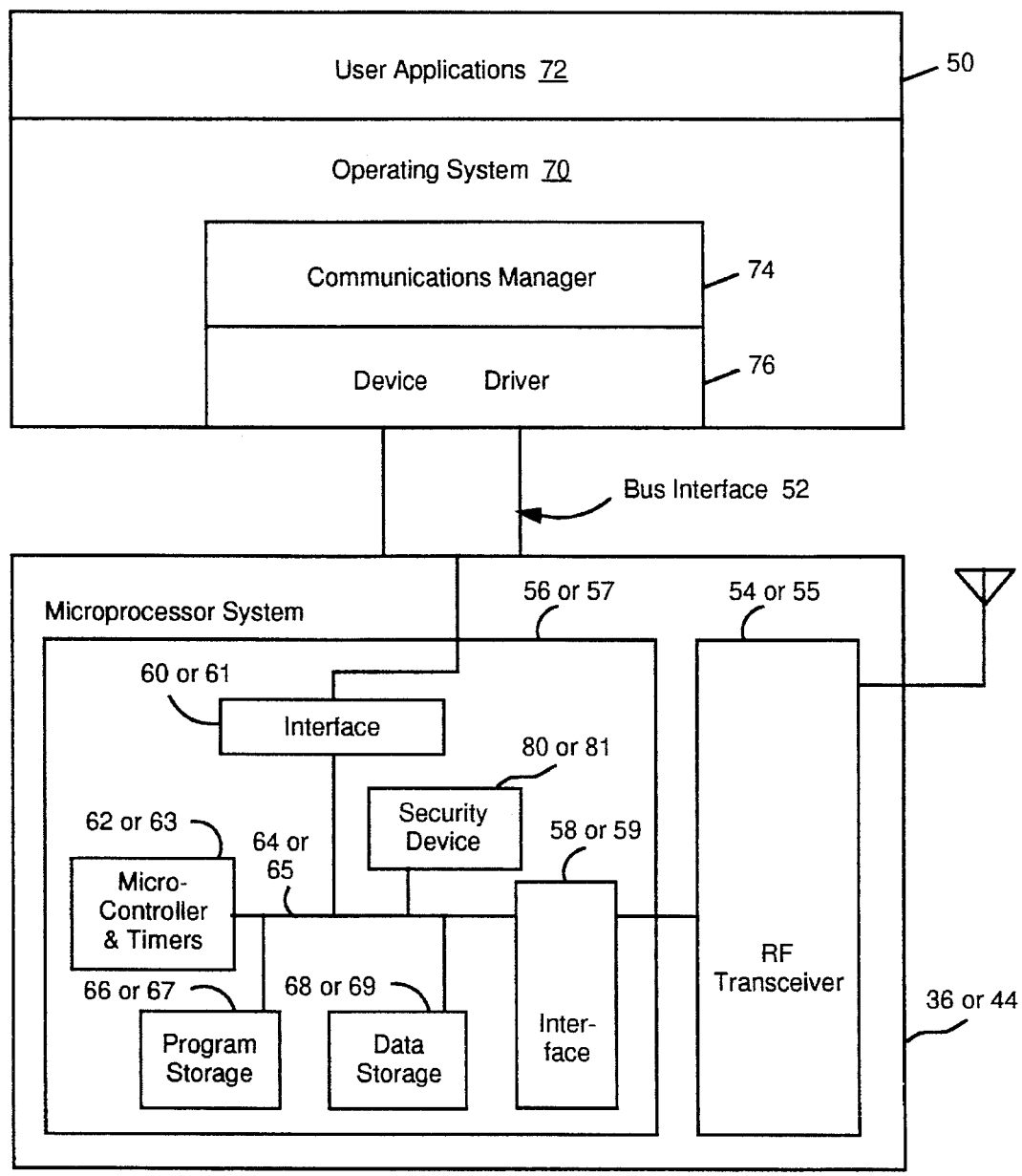
FIG. 2 is a block diagram of the radio system used in the implementation of a preferred embodiment of the invention.

FIG. 2 shows the radio system common to both the mobile stations and the base stations of FIG. 1. The radio system includes a transceiver adapter 36 or 44 connected to a computer 50 via the computer's bus interface 52. The transceiver section is itself divided into an RF transceiver 54 or 55, which may be commercially available spread spectrum transceiver, and a dedicated microprocessor system 56 or 57 which controls the transceiver via an interface 58 or 59. The microprocessor system 56 or 57 further includes a system interface 60 or 61 which interfaces the transceiver section to the computer section 50. The microprocessor system includes a dedicated microprocessor 62 or 63 containing high-resolution time interval determination nation hardware or "timers" typical of real-time microprocessor systems, and a security device 80 or 81, providing data encryption functions.

Microprocessor 62 or 63 and security device 80 or 81 are connected by a memory bus 64 or 65 to program storage 66 or 67 and data storage 68 or 69 as well as to interfaces 58 or 59 and 60 or 61 providing attachment to RF transceiver 54 or 55 and bus interface 52, respectively. Program storage 66 or 67 is typically read only memory (ROM), while data storage 68 or 69 is static or dynamic random access memory (SRAM or DRAM). Security device 80 or 81 is a commercially available integrated circuit (AM9568LC) available from Advanced Micro Devices.

The computer 50 runs an operating system 70 which supports one or more user application programs 72. The operating system 70 may include a communications manager 74, or the communications manager 74 may itself be an application program installed on the computer. In either case, the communications manager 74 controls a device driver 76 via the operating system 70. The device driver 76, in turn, communicates with the transceiver adapter 36 or 44 via bus interface 52.

When a data unit, designated as a "packet", is received from the device driver 76 by the microprocessor system 56 or 57, it is encrypted by the security device 80 or 81, prior to be stored in data storage 68 or 69 and communicated to the RF transceiver 54 or 55 via interface 58 or 59 under control of serial channels and a direct memory access (DMA) controller (not shown) which is part of the microprocessor 62 or 63. The function of these serial channels is to encapsulate data and control information in an HDLC (high-level data link control) packet structure and provide the packet in serial form to the RF transceiver 54 or 55. For more information on the HDLC packet structure, see, for example, Mischa Schwartz, Telecommunication Networks: Protocols, Modeling and Analysis, Addison-Wesley (1988).

When a packet is received through the RF transceiver 54 or 55, the serial channels check the packet destination address, check for errors, and deserialize the packet to data storage 68 or 69. The packet is decrypied by the security device 80 or 81 prior to be communicated to the device driver 76 via bus interface 52. The serial channels must have the capability to recognize a specific adaptor address as well as a broadcast address. Specific microprocessors with appropriate serial channel and timer facilities include the Motorola 68 or 69302 and the National Semiconductor HPC46500E microprocessors.

The security device 80 or 81 performs both data encryption and data decryption function. For that purpose, it uses a secret encryption key K. The security device 80 of transceiver adapter 36 and the security device 81 of transceiver adapter 44, must use the same encryption key K so that a packet encrypted by security device 80 using key K can be decrypted by security device 81 using the same key K.

Using the same key for large amounts of data, increases the risk that a potential intruder might break this key through statistical analysis of observed encrypted data flow. Therefore it is necessary to dynamically modify in a coordinated manner the value of the encryption key K shared by the security devices 80 and 81, with a fresh encryption key K' by using the method of the present invention.

Figure 3:
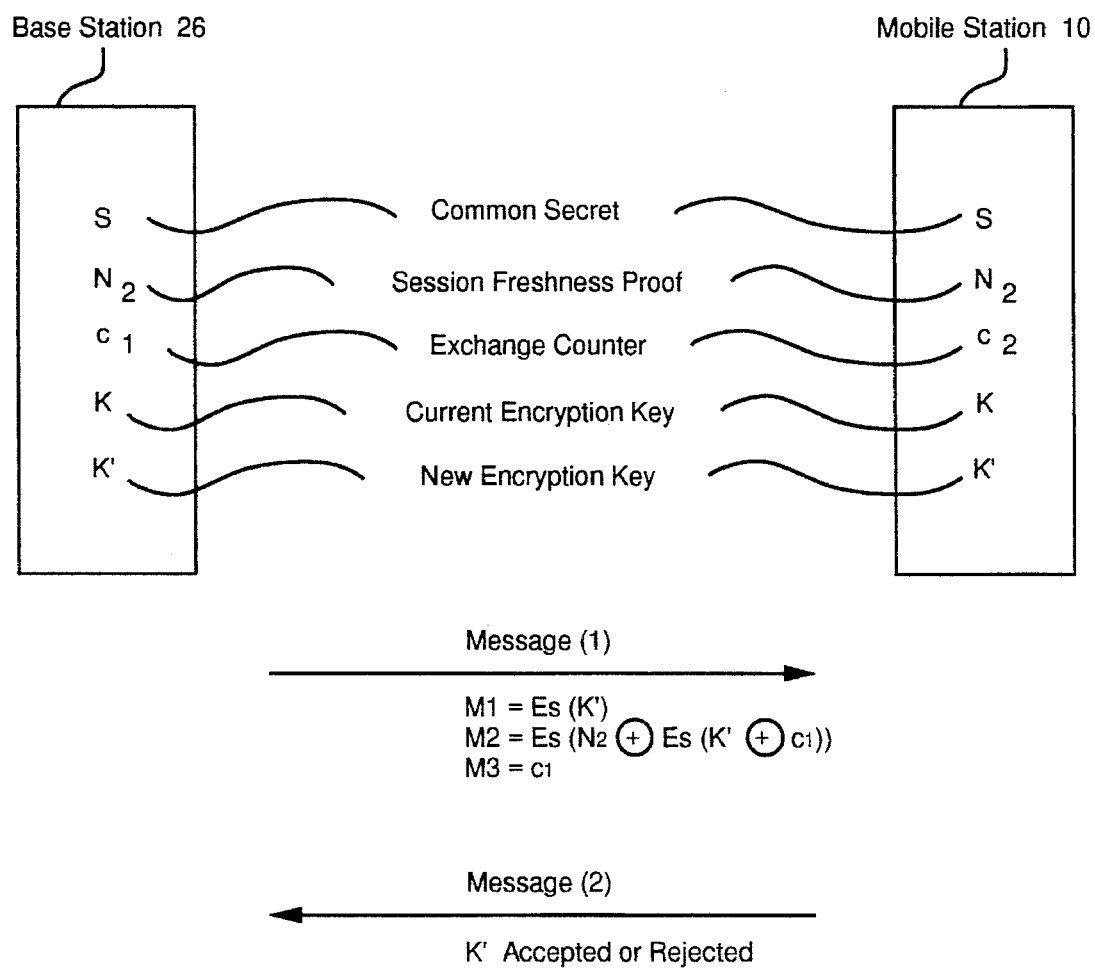
FIG. 3 is a representation of the data flow exchanged between the base station and the mobile station.

FIG. 3 shows the data flow used by a base station 26 to communicate a new encryption key K' to a mobile station 10 it is communicating with.

The base station 26 and the mobile station 10 share a common secret key S. This secret is stored in the base station and the mobile station at the time of installation of the indoor radio system. It is kept in a permanent memory so that it does not have to be loaded again each time the base station 26 or the mobile station 10 is powered off.

The secret key S is used by security device 80 or 81 to perform a function Es( ) which represents encryption with the secret key S; it can be for instance the Data Encryption Standard (DES) standardized by ANSI. The corresponding decryption function is denoted Ds(). Both functions Es( ) and Ds( ) can be performed by the security devices 80 and 81 of the base station and the mobile station respectively. Prior to transferring data, the base station 26 and the mobile station 10 complete an authentication procedure using the shared secret key S to initiate a communication session. An example of a family of suitable authentication procedures will be found in U.S. Pat. No. 5,148,479, "Authentication Protocols in Communication Networks", from the same applicant, which is herein incorporated by reference; in this embodiment of the present invention, Es is used as both the f and g functions referred to in said Authentication Protocols. As a result of said authentication procedure the base station and the mobile station both have knowledge of N2 which is a unique random number used by the Authentication Protocols described in the above mentioned U.S. Patent; N2 is used as a freshness proof of the communication session taking place between the base station and the mobile station; c1 and c2 are exchange counters controlled by the base station and the mobile station respectively, they are incremented each time a new instance of the encryption key K' is transmitted and validated. The exchange certificate M sent by the base station to the mobile station in Message (1) comprises three fields M1, M2 and M3 defined as follows, $M1 = Es(K')$ $M2 = Es(N2 \oplus es(K' \oplus c1))$ $M3 = c1$ Where $\oplus$ stands for an exclusive bit by bit logical OR operation.

In response to this first message the mobile station sends a second message, Message (2) to accept or reject the new encryption key K' depending on the result of validity tests performed by B using the three fields M1, M2 and M3 of the exchange certificate.

Illustrative flowcharts of the encryption key transmission and validation method are shown in FIGS. 4 through 7. These particular flow chart examples are based on the data flow shown in FIG. 3.

Figure 4:
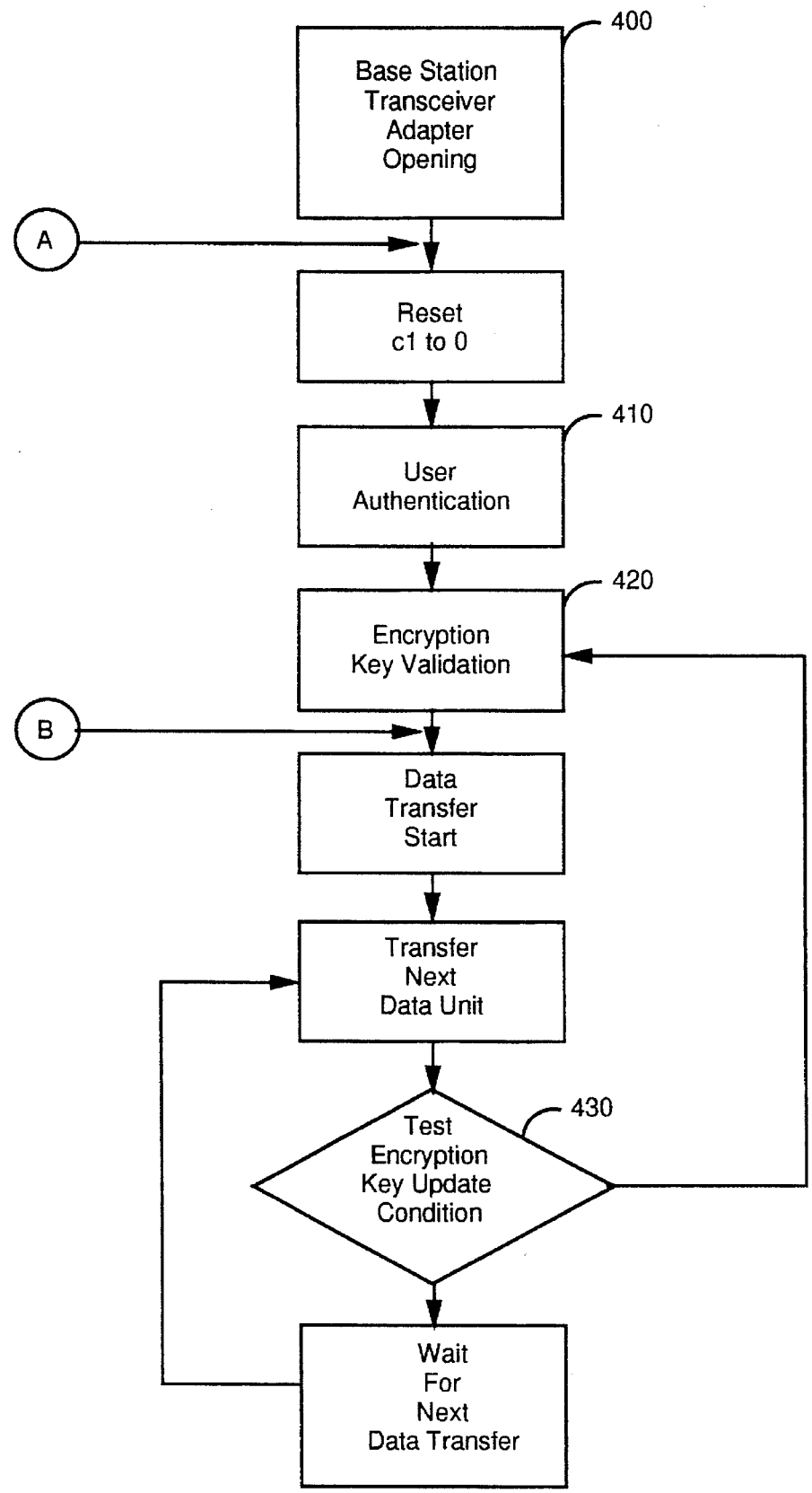
FIG. 4 is a flow chart representing the operations performed by the base station

The flow chart presented in FIG. 4 is executed by the base station transceiver adapter 36 of FIG. 1A, attempting to communicate with the mobile station transceiver adapter 44 of a mobile station of FIG. 1A. The process begins by an opening process performed in function block 400 comprising various initialization procedures and particularly a frequency synchronization procedure to establish a physical communication channel between the base station and the mobile station. Next, exchange counter c1 is reset to 0 and an authentication procedure is performed in function block 410 between the base station transceiver and the mobile station transceiver to open a communication session. As mentioned herein above a family of suitable authentication procedures will be found in U.S. Pat. No. 5,148,479. "Authentication Protocols in Communication Networks" from the same applicant. Following this step both stations have knowledge of a common session freshness proof N2, and an cryption key validation step is performed in function block 420, further described in FIG. 6 and 7. After validation of the encryption key data transfer starts; periodically an encryption key update condition is tested in decision block 430. The key update condition can be for instance triggered based on data representative of the amount of information transmitted with a given encryption key K or data representative of the life duration of K or a combination of these two criteria. If this condition is met the process loops back to function block 420, otherwise data transfer goes on using the current encryption key K.

Figure 5:
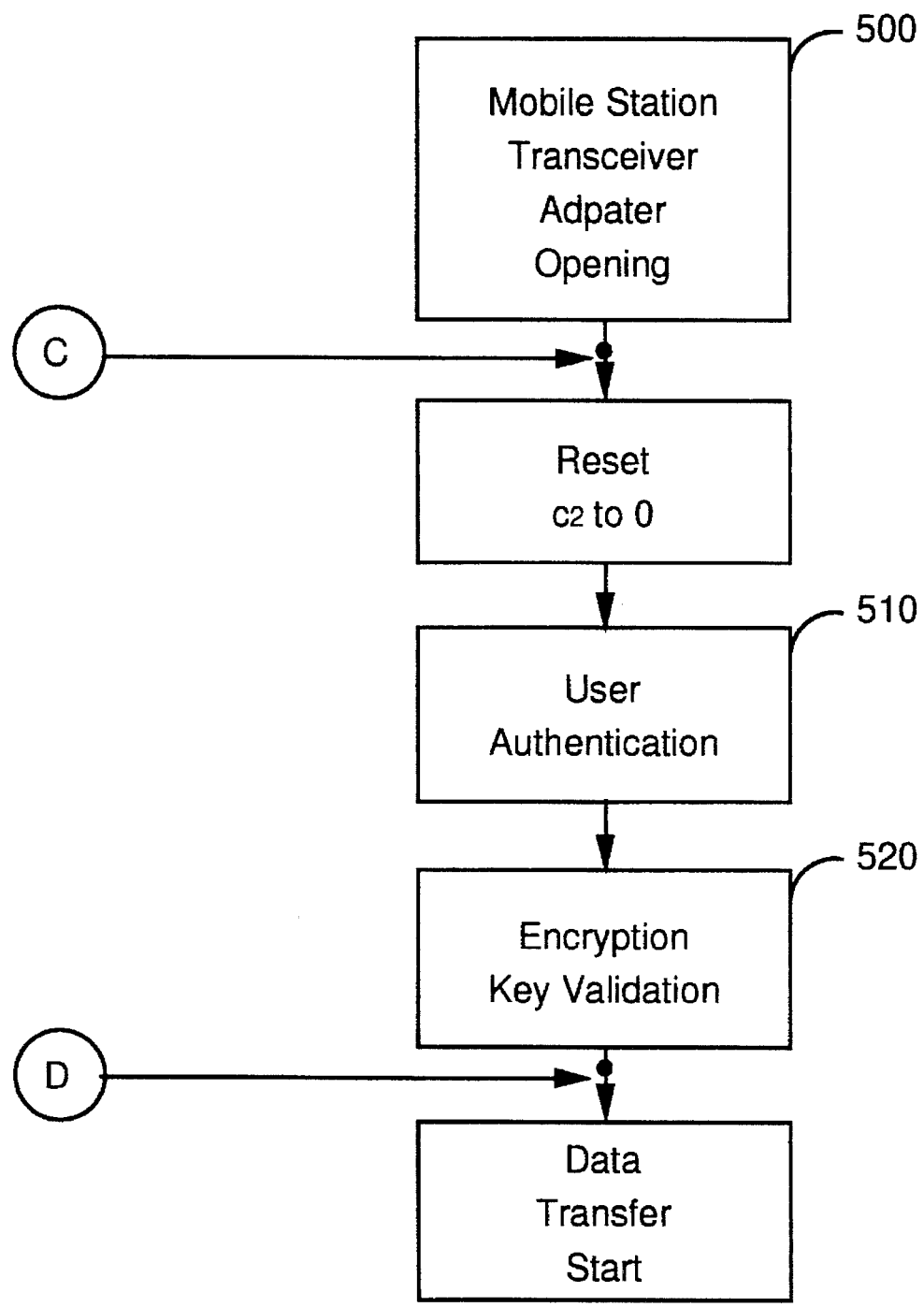
FIG. 5 is a flow chart representing the operations performed by the mobile station.

FIG. 5 shows the sequence of operations executed by the mobile station transceiver adapter 44. Function blocks 500, 510 and 520 are performed in conjunction with the corresponding function blocks of FIG. 4, respectively 400, 410 and 420. Function block 500 comprises the counterpart procedure of the initialization procedure of function block 400 and particularly a frequency synchronization procedure matching the one used in function block 400. Function block 510 is the counterpart of function block 410 as described in U.S. Pat. No. 5,148,479. Function block 520 performs the validation of the new encryption key K' and is further described in FIG. 7.

Figure 6:
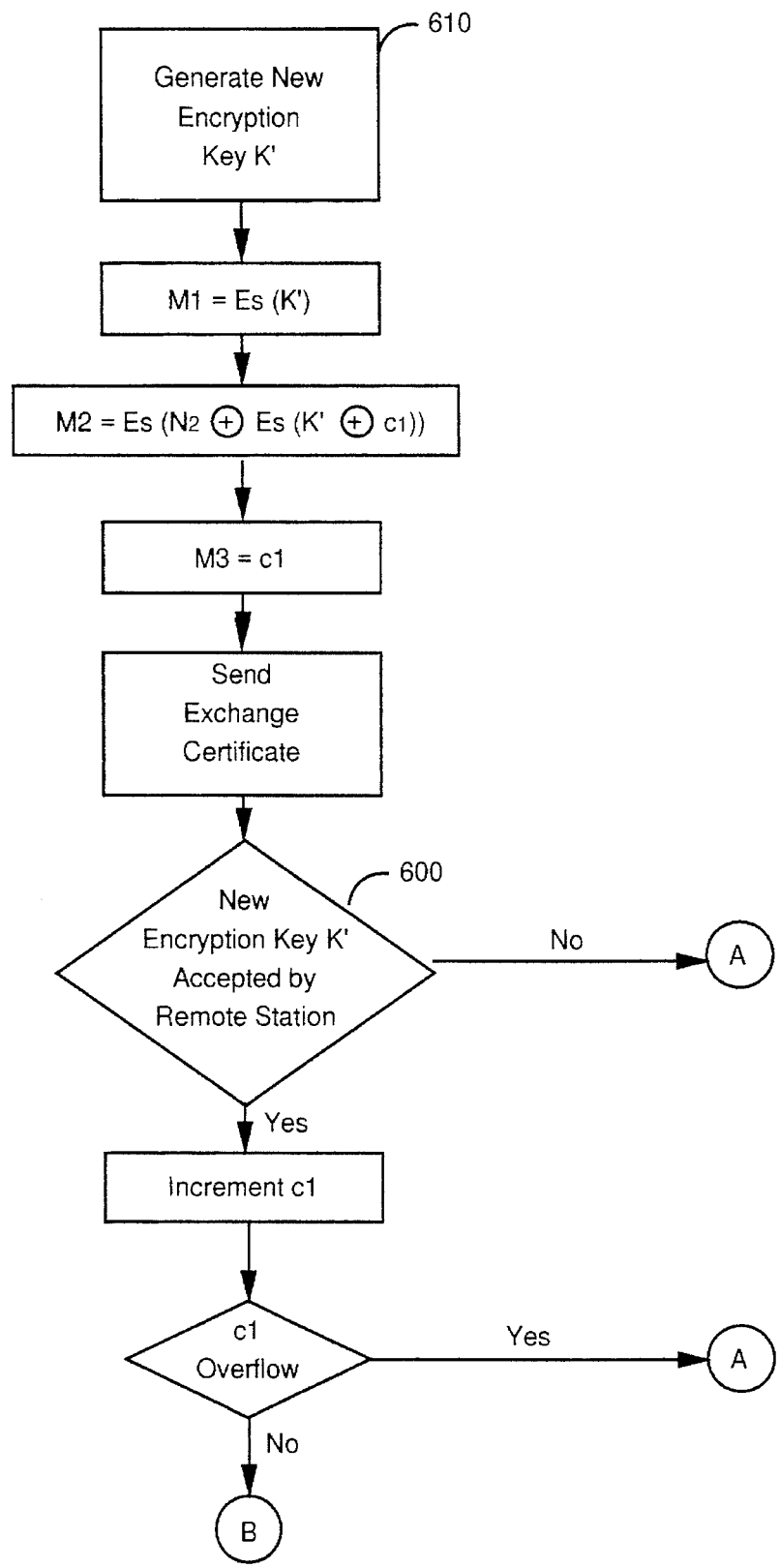
FIG. 6 is a flow chart representing the detail of the encryption key validation step performed by the base station.

FIG. 6 shows the details of function block 420. A new encryption key K' is generated in function block 610 and the three fields M1, M2 and M3 of the exchange certificate are built and sent to the mobile station. In decision block 600 a test is made on the message sent back by the mobile station in response to the exchange certificate. If the new encryption key is accepted by the mobile station, the exchange counter c1 is incremented. In case c1 is in overflow a return is made to FIG. 4 as indicated by the A connector to start again an authentication procedure, otherwise a return is made to FIG. 4 as indicated by the B connector to start data transfer. If the new encryption key is not accepted a return is made to FIG. 4 as indicated by the A connector to open a new communication session.

Figure 7:
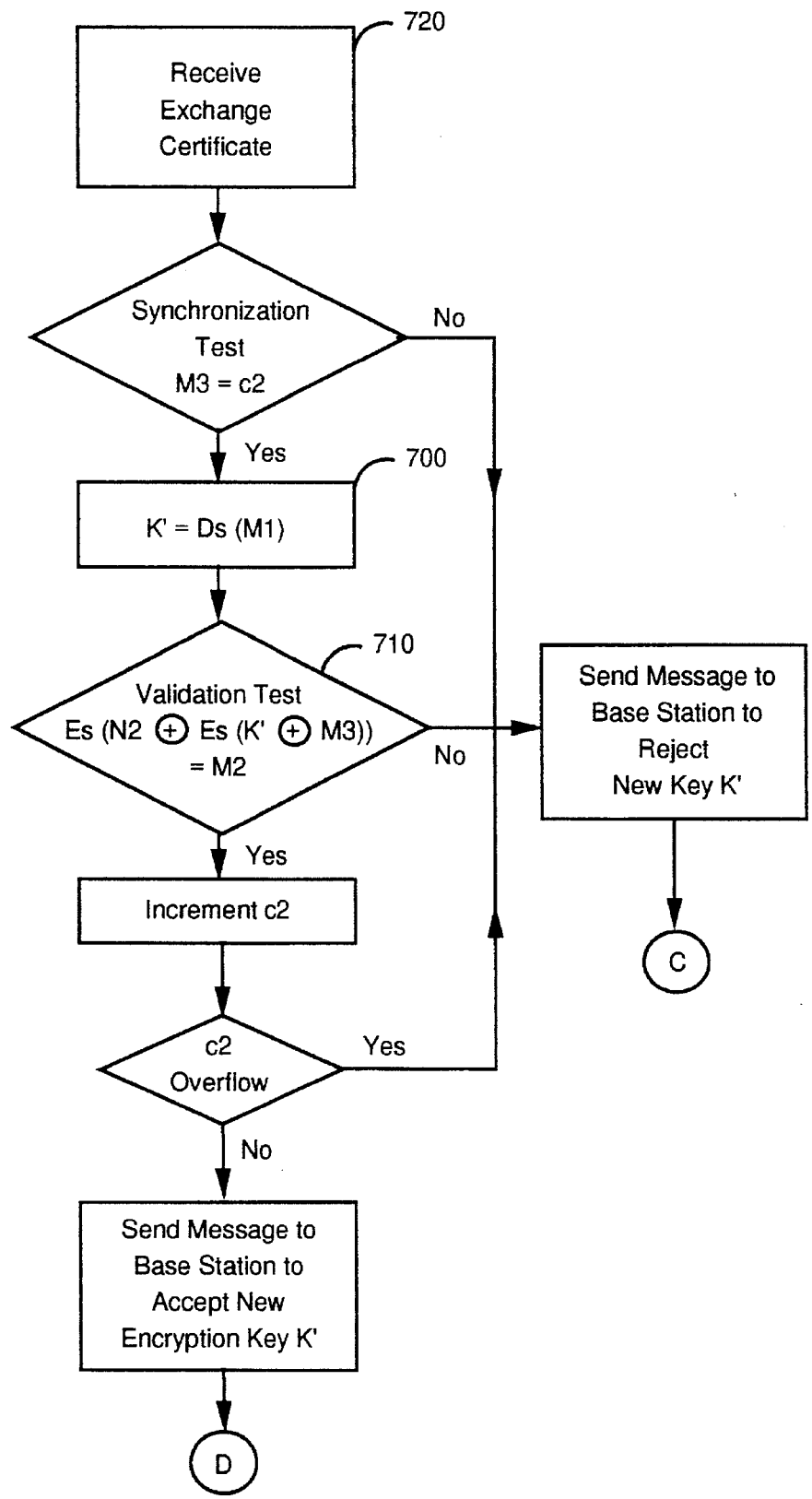
FIG. 7 is a flow chart representing the detail of the encryption key validation step performed by the mobile station.

FIG. 7 shows the details of function block 520, upon reception of the exchange certificate. The third field of the exchange certificate M3 is compared with c2 to check that exchange counters c1 and c2 are synchronized. If M3 does not equal c2 the new key K' is rejected by means of a message which is sent back to the base station, a return is then made to FIG. 5 as shown by connector C to open a new communication session. Function block 700 performs the decryption of the first field M1 of the exchange certificate under the secret S, the result of this operation K' is used to perform a validation test by evaluating the expression: $Es(N2 \oplus Es(K' \oplus c2))$
and comparing it with the second field M2 of the exchange certificate as shown in decision block 710. If they are equal, the validation test is positive, c2 is incremented; in case of c2 counter overflow the new key K' is rejected by means of a message which is sent back to the base station, and a return is then made to FIG. 5 as shown by connector C to open a new communication session; otherwise a message is sent to the base station to accept the new key K and a return is made to FIG. 5 as indicated by connection D to start data transfer. If the validation test is negative, the new key K' is rejected by means of a message which is sent back to the base station, a return is then made to FIG. 5 as shown by connector C to open a new communication session, identified by a new unique session freshness proof.

One particular aspect of this method is that the second field M2 of the exchange certificate binds cryptographically the values of N2, K' and c1 in the expression,
$M2 = Es(N2 \oplus Es(K' \oplus c1))$.

The man skilled in the art can easily derive from this particular expression a more general one of the form, M2=Es( r op Es(s op' t) ) wherein,
•r, s, t are functions of the minimum form:
r=r(N2 .... )
s=s(K', ...)
t=t(c1, ...)
op an op' arc mathematical or Boolean operations.

Similarly fields M1 and M3 can be generalized and take the following minimum form:

M1=Es( q )
M3=h( c1, . . . )
wherein q is of the minimum form,
q=q(K', . . . )

The embodiment of the present invention described herein above needs to be slightly modified when the encryption key K is too long to be encrypted in a single pass of the security device 80 or 81. In this alternate embodiment cipher block chaining (CBC) techniques are used to compute the first field M1 of the exchange certificate. For instance, assuming that the encryption key is 24 bytes long and that the security device can handle only 8 bytes at a time, M1 would consist in the concatenation in a CBC string of the following three CBC blocks:

CBC1=Es (n'),
CBC2=Es (m'⊕Es (n')),
CBC3=Es (1'⊕Es (m'⊕Es (n')) ), wherein 1' represents the first 8 bytes of K', m' represents the following 8 bytes and n' represents the last eight bytes of K'.

This alternate embodiment of the invention uses, a different expression to build M2 thus reducing the amount of calculations to be performed. As a matter of fact, M2 can be simplified, without departing from the scope of the present invention, by using the following expression:

M2=Es (N2⊕Es (CBC3⊕c1) ),

This reduces the computations to be performed to obtain M2, since CBC3 can be directly obtained from the computation of M1, while maintaining a high level of security since CBC3 cryptographically binds in a condensed form information representative of K'.

Consequently, the form taken by the exchange certificate M in this alternate embodiment would comprise the three following fields M1, M2, M3 wherein, M1 comprises CBC1, CBC2, CBC3,
and wherein,
CBC1=Es (n')
CBC2=Es (m'⊕CBC1)
CBC3=Es (1'⊕CBC2)
M2=Es (N2⊕Es (CBC3⊕c1)),
and
M3=c1

More generally CBC3 can be described as the last element of the CBC string used to transmit K'.

While the preferred embodiments described herein above deal with encryption key transmission, the man skilled in the art can easily extend the scope of the present invention to the transmission and validation of a value of any variable transmitted between two users of a communications system.

Besides that, the above &scribed arrangements are merely illustrative of the application of principles of the invention in which it is assumed that a first user A of a communications system transmits to a second user B a value K' of a variable, said users shag a common secret key S and having established a first communication session identified by a unique session freshness proof N2 known to both user A and user B. Other arrangements may be devised by using exchange certificate structures comprising at least two fields M1 and M2 of the minimum form:

M1=f( S, K', . . . ),
M2=g( S, K', N2, c1, . . . ), wherein f and g are injective functions such that:
given a value m1 of field M1,
f( S, K', . . . )=m1 cannot be solved for K' without knowledge of S; and
given a value m2 of field M2,
g( S, K', N2, c1, . . . )=m2 cannot be solved for K' without knowledge of S.
and wherein,
c1 is an exchange counter controlled by A and representative of the number of values of said variable exchanged between user A and user B during said first communication session.

Consequently, an eavesdropper intercepting this exchange certificate cannot get knowledge of the value K' since he does not know the secret key S.

In addition, the present invention allows to protect this exchange certificate against replay attacks. This is achieved by insuring that a given instance of couple (N2, c1) is never used twice; in the event that either of exchange counters c1 and c2 reaches its maximum value, said first communication session between A and B is interrupted and a second communication session, identified by a new and unique session freshness proof, is opened thus avoiding that the prior session freshness proof N2 keep king used when said counter is reset to its initial value.

Using its knowledge of S, user B derives from said exchange certificate M, said value K' as a result of solving for K' equation, f( S, K', . . . )=M1;

It then validates said value K' as a result of the verification of a set of validation conditions comprising at least an equation of the minimum form, g( S, K', N2, c2, . . . )=M2 wherein, c2 is an exchange counter controlled by B and representative of the number of values of said variable exchanged between user A and user B during said first communication session.

The form selected for this validation condition allows, in a single operation, to verify that the values of S, K', N2, c2 used by B correspond to the ones used by A to compute M.

Optionally the exchange certificate M may comprise a third field M3 of the minimum form:

M3=h( c1, . . . )
wherein h( ) is an injective function.

Field M3 allows B to test a second validation condition by checking that exchange counters controlled by A and B, respectively c1 and c2, carry the same value. This is done by testing equation, h( c2, . . . )=M3.

If anyone among said set of validation conditions fails, said first communication session cannot be trusted anymore, B interrupts said first communication session and a second communication session identified by a second unique session freshness proof is opened after A and B mutually authenticate one another; the method suggested for mutual authentication in this description of the invention is the one described in U.S. Pat. No. 5,148,479 but other methods could be used.

We claim:

1. A method for transmitting a value K' of a variable, between a first user A of a communications system and a second user B, and for validating said value K', said users sharing a common secret key S and having established a first communication session identified by a first unique session freshness proof N2 known to both user A and user B, said method being characterized in that it comprises the steps of:

a. transmitting from A to B said value K' by means of an exchange certificate comprising at least two fields M1 and M2 of the minimum form:

M1=f( S, K', ... )
M2=g( S, K', N2, c1, ... )

wherein f( ) and g( ) are functions such that, f( S, K', ... )= m1 cannot be solved for K' without knowledge of S, m1 being a given value of field M1 and, g( S, K', N2, c1, ... )=m2 cannot be solved for K' without knowledge of S, m2 being a given value of field M2;

and wherein, c1 is an exchange counter controlled by A and representative of the number of values of said variable exchanged between user A and user B during said first communication session;

b. processing by B of said exchange certificate M comprising the steps of:

•deriving from said exchange certificate M said value K' as a result of solving for K' equation:

f( S, K', ... )=M1; and

•validating said value K' as a result of the verification of a set of validation conditions comprising at least an equation of the minimum form:

g( S, K', N2, c2, ... )=M2 wherein, c2 is an exchange counter controlled by B and representative of the number of values of said variable exchanged between user A and user B during said first communication session.

c. interrupting at the initiative of either A or B said first communication session between A and B and opening a second communication session identified by a second unique session freshness proof upon occurrence of anyone of a set of session reset conditions, said set of reset conditions comprising failure of at least one of said validation conditions.

2. The method of claim 1 wherein said set of session reset conditions further comprises the event that either of exchange counters c1 and c2 reaches its maximum value.

3. The method according to any one of claims 1 or 2 wherein, f(S, K', ... )=Es(q)
g(S, K', N2, c1, ... )=Es(r op Es(s op' t))

wherein

Es( ) is a data encryption function using S as the encryption key;

op and op' are mathematical or Boolean operations; and q, r, s, t are functions of the minimum form q=q(K', ... )
r=r(N2, ... )
s=s(K', ... )
t=t(c1, ... ).

4. The method of claim 3 wherein op and op' represent exclusive bit by bit OR Boolean.

5. The method of claim 4 wherein functions q, r, s and t are:

q(K', ... )=K'
r(N2, ... )=N2
s(K', ... )=K'
t(c1, ... )=c1

6. The method according to any one of claims 1 or 2 wherein said exchange certificate further comprises a third field M3 of the minimum form M3=h( c1, ... ).

7. The method of claim 6 wherein said set of validation conditions further comprises verifying that h( c2, ... )=M3.

8. The method of claim 7 wherein function h is h( c, ... )=c.

9. A system for transmitting a value K' of a variable, between a first user A of a communications system and a second user B, and for validating said value K', said users sharing a common secret key S and having established a first communication session identified by a first unique session freshness proof N2 known to both user A and user B, said system comprising:

a. means for transmitting from A to B said value K' by means of an exchange certificate comprising at least two fields M1 and M2 of the minimum form:

M1=f(S, K', ... )
M2=g(S, K', N2, c1, ... )

wherein F() and g() are functions such that, f(S, K', ... )= m1 cannot be solved for K' without knowledge of S, m1 being a given value of field M1 and, g(S, K', N2, c1, ...)=m2 cannot be solved for K' without knowledge of S, m2 being a given value of field M2;

and wherein, c1 is an exchange counter controlled by A and representative of the number of values of said variable exchanged between user A and user B during said first communication session;

b. means for processing by B of said exchange certificate M comprising:

means for deriving from said exchange certificate M said value K' as a result of solving for K' equation:

f(S, K', ... )=M1; and means for validating said value K' as a result of the verification of a set of validation conditions comprising at least an equation of the minimum form:

g(S, K', N2, c2, ...)=M2 wherein, c2 is an exchange counter controlled by B and representative of the number of values of said variable exchanged between user A and user B during said first communication session;

c. means for interrupting at the initiative of either A or B said first communication session between A and B and opening a second communication session identified by a second unique session freshness proof upon occurrence of any one of a set of session reset conditions, said set of reset conditions comprising failure of at least one of said validation conditions.

10. The system of claim 9 wherein said set of session reset conditions further comprises the event that either of exchange counters c1 and c2 reaches its maximum value.

11. The system of either of claims 9, or 10 wherein, $f(S, K', \ldots) = E_s(q)$ $g(S, K', N2, c1, \ldots) = E_s(r \text{ op } E_s(s \text{ op}' t))$ wherein $E_s(\ )$ is a data encryption function using S as the encryption key;

op and op' are mathematical or Boolean operations; and q, r, s, t are functions of the minimum form $q = q(K', \ldots)$
$r = r(N2, \ldots)$
$s = s(K', \ldots)$
$t = t(c1, \ldots)$.

12. The system of claim 11 wherein op and op' represent exclusive bit by bit OR Boolean operation.

13. The system of claim 12 wherein functions q, r, s and t are:

$q(K', \ldots) = K'$
$r(N2, \ldots) = N2$
$s(K', \ldots) = K'$
$t(c1, \ldots) = c1$.

14. The system according to any of claims 9 or 10 wherein said exchange certificate further comprises a third field M3 of the minimum form $M3 = h(c1, \ldots)$.

15. The system of claim 14 wherein said set of validation conditions further comprises means for verifying that $h(c2, \ldots) = M3$.

16. The system of claim 15 wherein function h is $h(c, \ldots) = c$.

17. The system of claim 9 wherein said communications system uses a radio frequency communication channel.

18. The system of claim 9 wherein said communications system uses an infrared communication channel.

* * * * *